United States Patent [19]

Gröner

[11] Patent Number: 5,102,554
[45] Date of Patent: Apr. 7, 1992

[54] METHOD OF RECOVERING PHOSPHOR FOR PICTURE TUBES

[75] Inventor: Peter Gröner, Denkendorf, Fed. Rep. of Germany

[73] Assignee: Nokia Unterhaltungselektronik, Pforzheim, Fed. Rep. of Germany

[21] Appl. No.: 640,253

[22] Filed: Jan. 11, 1991

[30] Foreign Application Priority Data

Jan. 12, 1990 [DE] Fed. Rep. of Germany ....... 4000755

[51] Int. Cl.$^5$ ...................... B01D 21/00; B01D 33/03; C09K 11/08
[52] U.S. Cl. .................................. 210/695; 210/774; 210/785; 210/804; 210/806; 210/906; 252/301.4 R
[58] Field of Search ............... 210/695, 774, 785, 906, 210/223, 388, 804, 806; 252/301.4 R, 301.4 S, 301.4 P

[56] References Cited

U.S. PATENT DOCUMENTS

| | | | |
|---|---|---|---|
| 3,649,216 | 3/1972 | Hammond et al. | 252/301.4 R |
| 3,864,273 | 2/1975 | Forbes et al. | 252/301.4 R |
| 4,306,974 | 12/1981 | Harry | 210/388 |
| 4,492,633 | 1/1985 | Sandulyak et al. | 210/223 |

FOREIGN PATENT DOCUMENTS 62-295988 12/1987 Japan ........................... 252/301.4 R Primary Examiner—W. Gary Jones
Attorney, Agent, or Firm—Ware, Fressola, Van Der Sluys & Adolphson

[57] ABSTRACT

In a method of recovering phosphor for picture tubes from phosphor sludge, the phosphor sludge is first subjected to a steam treatment, thereby causing substances adhering to the surface of the phosphor particles to pass into solution. The phosphor is then washed several times. Following wet screening, one then obtains a phosphor suspension that can be further processed just like virgin phosphor. The said method does not comprise any drying or calcining processes. The steam treatment causes the phosphor particles in the phosphor sludge to lose their tendency to cluster and form lumps, so that one obtains a high-yield suspension of very fine phosphor particles that can be further processed without any additional grinding or homogenization steps.

12 Claims, 1 Drawing Sheet

METHOD OF RECOVERING PHOSPHOR FOR PICTURE TUBES

BACKGROUND OF THE INVENTION

1. Field of the Invention

The present invention relates to a method of recovering phosphor from phosphor sludge, especially that emits green upon being excited by electron beams in a picture tube.

2. Description of the Prior Art

Phosphor suspensions for coating frontal glass panels for picture tubes are provided with various additives, especially sodium dichromate, PVA and acrylate. During the coating process any excess suspension will be spun off the glass panel. The suspension spun off will find its way into the so-called phosphor sludge, and the same applied as regards the suspension that, following exposure of the coating, will be washed away from the unexposed parts. Traditionally the phosphor sludge is washed and then collected until a given charge quantity is available. The collected phosphor is dried for one hour at about 200° C. and subsequently calcined at about 400°-450° C. for one hour. This is followed by screening with a relatively coarse mesh size, namely about 60-70 mm, and grinding in a ball mill together with water and PVA. Other customary steps follow especially a prechroming process in a storage tank. This traditional method requires a great deal of time and energy and, given the grinding process, leads to a reduction of the luminosity of the recovered phosphor as compared with the luminosity of virgin phosphor.

Accordingly, there existed the problem of finding a simple method of recovering phosphor for picture tubes from phosphor sludge that would yield recovered phosphor of high quality.

SUMMARY OF THE INVENTION

The method of recovering phosphor for picture tubes from phosphor sludge of the present invention is characterized by the following processing steps:
   heating of the phosphor sludge to at least 92° C.,
   washing of the phosphor suspension, and
   wet screening of the phosphor suspension.

This method no longer comprises any drying or calcining processes. This leads not only to energy savings, but also makes it possible to work continuously or quasicontinuously, with small charges. The traditional calcining, on the other had, made it advantageous to collect larger charges, since this avoids having to carry out numerous heating and cooling processes. The exclusively wet treatment according to the invention avoids the baking together of phosphor particles, which would then have to be reseparated by grinding. A grinding process can therefore be omitted, thereby preserving the luminosity of virgin phosphor. The avoidance of phosphor particles that are baked together is greatly facilitated by the fact that the sludge is heated to at least about 92° C. right at the beginning of the recovery process, preferably by passing steam through the phosphor sludge. This detaches any organic matter adhering to the surface of the particles. Organic matter on phosphor particles, owing to various effects, produces a strong clustering tendency.

As already mentioned, it is particularly advantageous to heat the sludge with steam. When this is done, the hot steam passes over the phosphor particles and makes a specially good contribution to dissolving the organic components. It is of advantage to introduce the steam in as finely distributed a manner as possible, thereby creating a greater reaction surface between the steam and the phosphor particles. It is also of advantage if the steam is not substantially hotter than 100° C., becasue—at any given energy lever—this will lead to a longer reaction time than with steam at a higher temperature. The longer reaction time ensures specially intensive steam treatment of all the phosphor particles.

If the wet screening step is to be quick and efficient, it will be advantageous to employ a two-stage vibrating screen, with the first screen having a mesh size of—say—100 mm and the second screen preferably a mesh size of only about 30-40 mm. Fine metallic detritus is removed by magnetic means.

DETAILED DESCRIPTION OF THE PREFERRED EMBODIMENT

Figure 1:
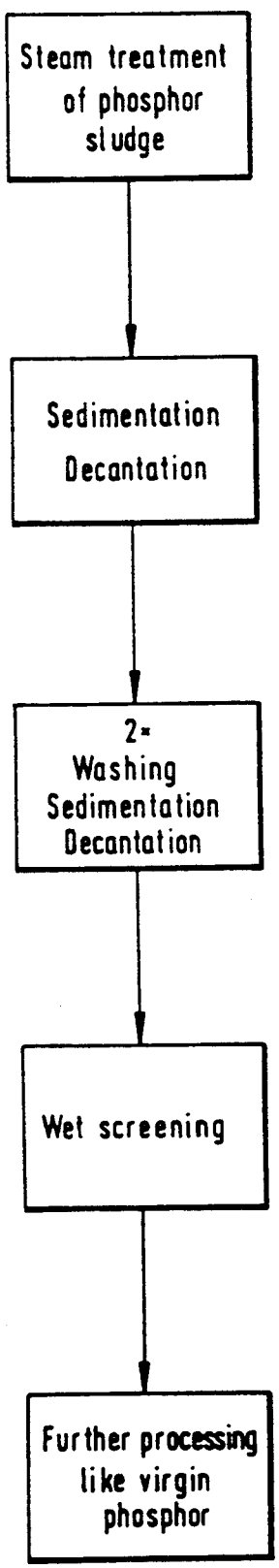
FIG. 1 shows a flow chart illustrating a method of recovering phosphor for picture tubes from phosphor sludge.
Figure 2:
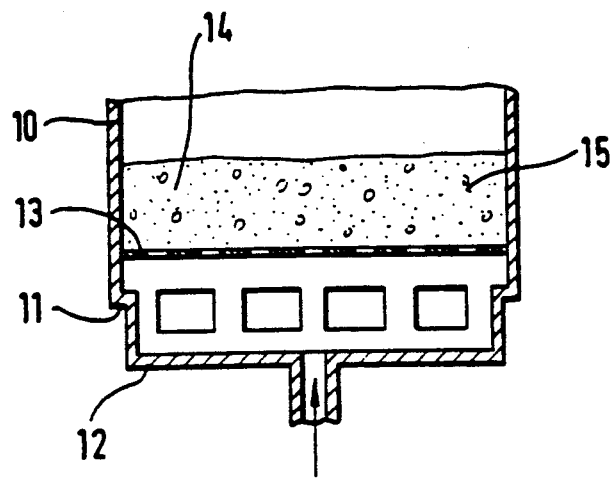
FIG. 2 shows a schematic representation of a reaction vessel in the bottom of which there are steam entry apertures.
Figure 3:
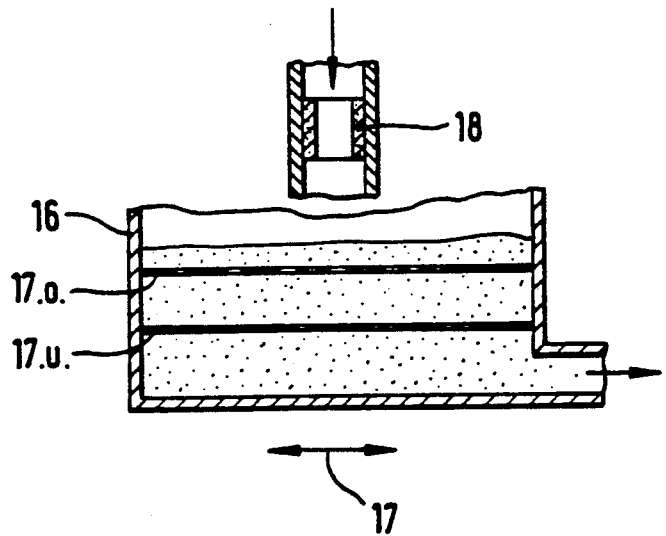
FIG. 3 shows a schematic representation of a vibrating screen.

For the purposes of the method of the described embodiment, phosphor sludge is collected in containers having a capacity of 30 l. The sludge contains about 0.2% by weight of phosphor. In a first processing step the phosphor sludge is treated with steam at 110° C. and a pressure of 200 kPa. This is done in a reaction vessel 10 as shown in FIG. 2. The bottom of the reaction vessel is provided with apertures that receive steam via a distribution system 12. Arranged a few centimeters above the bottom 11 there is a perforated plate 13 with numerous small holes. This arrangement ensures that finely distributed steam bubbles 14 will rise through the phosphor sludge 15. The sludge is heated for about 20-30 minutes, attaining a temperature of the order of 92°-96° C. If satisfactory treatment results are to be obtained, the temperature of the treated phosphor sludge should reach at lest 92° C. This steam treatment detaches organic matter, especially acrylate, from the surface of the phosphor particles. This detachment can also be obtained when the phosphor sludge is heated by means of heated walls of the reaction vessel 10, but the treatment results are substantially better when steam is used. The phosphor particles will settle after the steam treatment, and the supernantant aqueous solution, which contains especially organic matter and zinc chromate, is then decanted. The sludge is then washed twice, on each occasion with about 30 l of water, followed by settlement and decantation. Each of the aforementioned three sedimentation and decantation steps requires about 20-30 minutes. If the coarser particles are now removed from the phosphor sludge prepared in this manner, the residue can be further processed just like virgin phosphor. The coarser particles are removed by wet screening. The described embodiment made use of a two-stage vibrating screen 16 as shown in FIG. 3. The double-headed arrow indicates the vibrating motion of the screen. The screen consists of an upper screen 17.o having a mesh size of 100 mm and a lower screen 17.u with a mesh size of 40 mm. The screening of a charge of the aforementioned size will also require about 20-30 minutes, like each of the other processing steps. The phosphor suspension is fed to the wet screen via a magnetic separator 18. As already mentioned, the wet-screened phosphor can then be subjected to further processing just like virgin phosphor. The method of the described embodiment makes it possible to produce a suspension of very fine phosphor particles with a high yield. This above all because the heat treatment in the first processing step, especially the treatment with steam, has the effect of reducing the clustering and lump formation tendency that is characteristic of the phosphor particles contained in the sludge.

I claim:

1. A method of recovering phosphor for picture tubes from an aqueous phosphor sludge containing phosphor particles, comprising the steps of:
　heating the aqueous phosphor sludge to at least 92° C. to detach substances adhering to the phosphor particles and thereby form a phosphor suspension,
　after heating, washing the phosphor suspension, and
　after washing, wet screening the phosphor suspension.

2. A method according to claim 1, wherein steam is used for the heating step.

3. A method according to claim 2, wherein finely distributed steam is blown into the aqueous phosphor sludge from below.

4. A method according to claim 2, wherein the steam has a temperature of about 100°-120° C.

5. A method according to claim 1, wherein the wet screening is performed with a two-stage vibrating screen.

6. A method according to claim 1, wherein the phosphor suspension is passed through a magnetic separator prior to the wet screening.

7. A method according to claim 1, wherein the aqueous phosphor sludge is heated to a temperature in the range of 92°-96° C.

8. A method according to claim 1, wherein the washing step further includes the steps of:
　allowing said phosphor particles to settle from said suspension; and
　thereafter decanting a supernatant aqueous solution from about the settled phosphor particles.

9. A method according to claim 1, additionally comprising the steps of:
　immediately after heating, allowing said phosphor particles to settle from said suspension; and
　thereafter decanting a supernatant aqueous solution from above the settled phosphor particles.

10. A method of recovering phosphor for picture tubes from an aqueous phosphor sludge containing phosphor particles, comprising the steps of:
　heating the aqueous phosphor sludge to a temperature within the range of 92°-96° C. to detach substances adhering to the phosphor particles and thereby form a phosphor suspension;
　allowing the phosphor particles to settle from said suspension;
　decanting a supernatant aqueous solution containing the detached substances from above the settled phosphor particles;
　washing the phosphor suspension;
　allowing phosphor particles to settle from said washed suspension;
　decanting a supernatant aqueous solution from above the settled phosphor particles; and
　wet screening the phosphor suspension.

11. A method according to claim 10, wherein the heating step is performed by blowing finely distributed steam into the aqueous phosphor sludge from below.

12. A method according to claim 11, wherein the steam is provided at a temperature in the range of 110°-120° C.

* * * * *

UNITED STATES PATENT AND TRADEMARK OFFICE
CERTIFICATE OF CORRECTION

PATENT NO. : 5,102,554
DATED : April 7, 1992
INVENTOR(S) : P. Gröner

It is certified that error appears in the above-identified patent and that said Letters Patent is hereby corrected as shown below:

At column 4, line 9, please change "about" to --above--.

Signed and Sealed this

Third Day of August, 1993

Attest:

MICHAEL K. KIRK

Attesting Officer     Acting Commissioner of Patents and Trademarks